Sept. 5, 1933.  F. F. ASHBY  1,925,128

BASKET AND CLOSURE THEREFOR

Filed July 10, 1931   2 Sheets-Sheet 1

Inventor
F. F. Ashby
By Arthur F. Durand
Atty.

Sept. 5, 1933.　　　　　F. F. ASHBY　　　　　1,925,128
BASKET AND CLOSURE THEREFOR
Filed July 10, 1931　　2 Sheets-Sheet 2
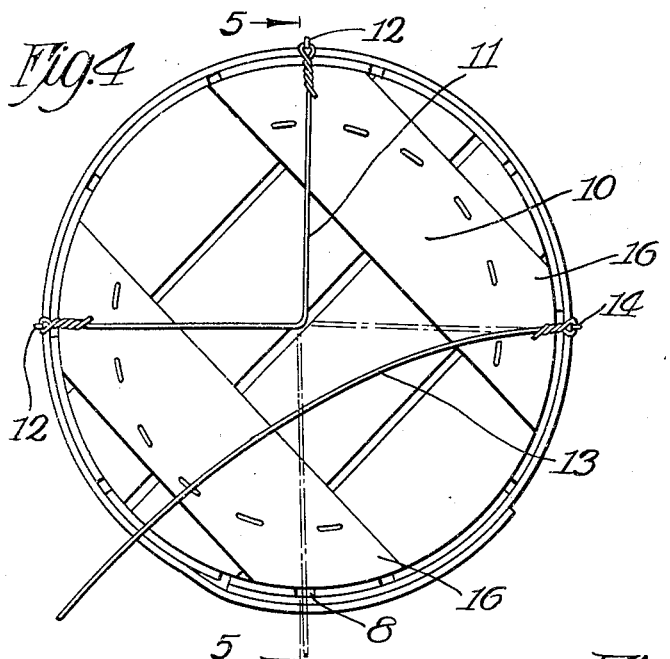
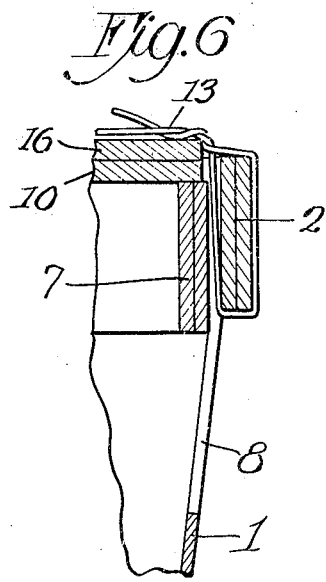
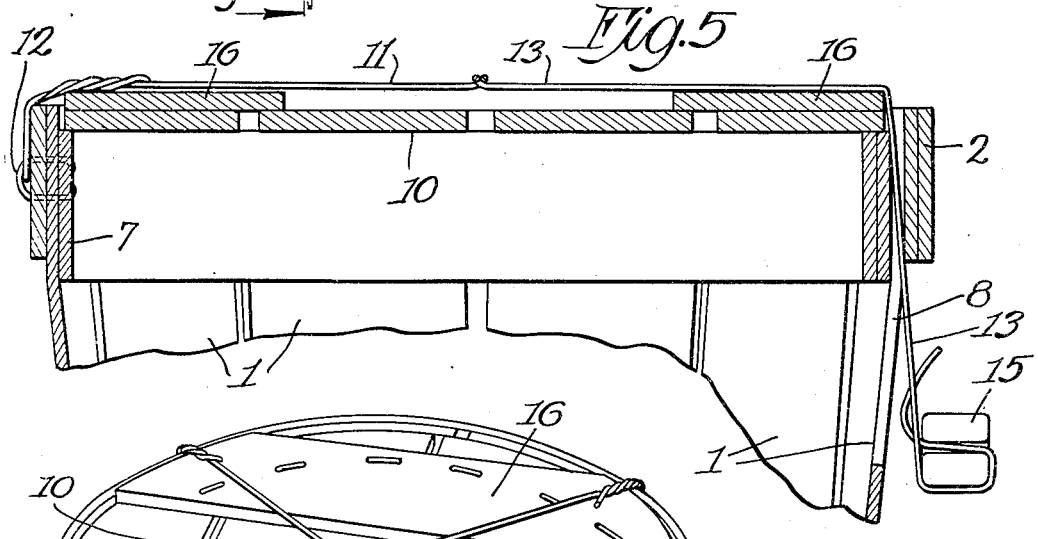
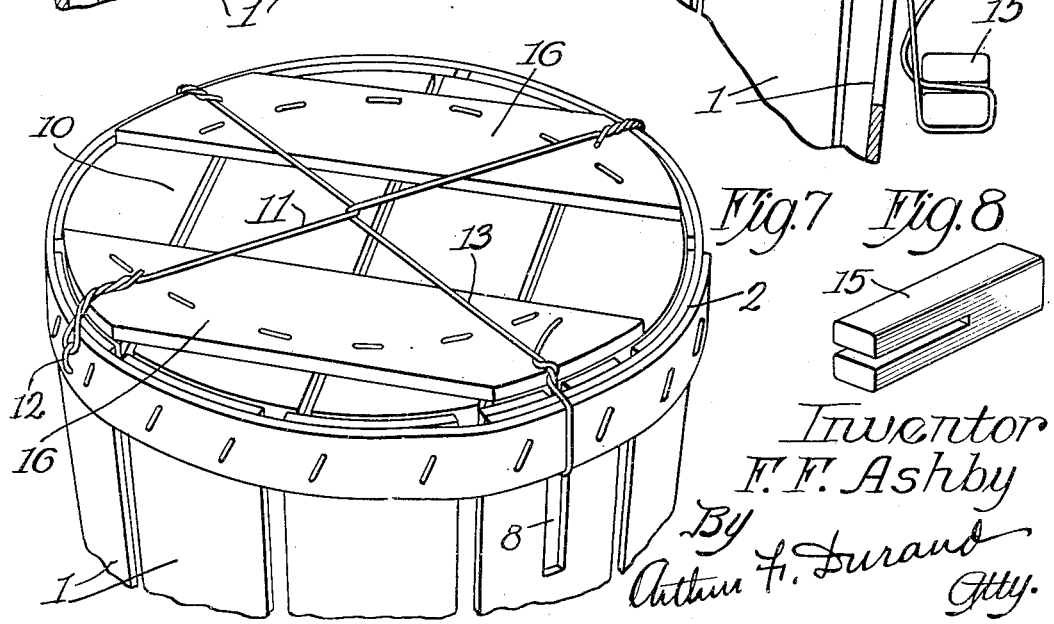
Inventor
F. F. Ashby
By Arthur F. Durand
Atty.

Patented Sept. 5, 1933

1,925,128

UNITED STATES PATENT OFFICE 1,925,128

BASKET AND CLOSURE THEREFOR

Fred F. Ashby, Jackson, Tenn.

Application July 10, 1931. Serial No. 549,879

10 Claims. (Cl. 217—124)

This invention relates to baskets or similar receptacles, and to means for securing a cover in place thereon, and to the method of manufacture thereof.

Generally stated, the object of the invention is to provide a novel and improved construction and arrangement whereby the cover for a basket or similar receptacle, such as a hamper basket, may be fastened in place, either in tight engagement with the rim of the basket or receptacle, or in a more or less raised position, if the contents of the basket or receptacle extend above the top thereof, by means of wires anchored to the rim and extending over the cover, and to provide a novel and improved method of constructing the said basket and receptacle, whereby the rim of the basket or receptacle is better adapted for use in connection with said fastening wires.

It is also an object to provide certain details and features of construction and combinations and method steps tending to increase the general efficiency and the desirability of a cover fastening means of this particular character.

To the foregoing and other useful ends, the invention consists in matters hereinafter set forth and claimed and shown in the accompanying drawings, in which—

Fig. 4 is a similar view showing the cover in place, and showing the fastening wires for securing the cover on the basket.

Fig. 5 is an enlarged vertical section of the upper portion of the basket, and of the cover therefor, illustrating how the fourth end of the wire is manipulated to draw the wires taut over the top of the cover.

Fig. 6 is a detail sectional view, showing how the said fourth end of the wire is finally secured in place.

Fig. 7 is a perspective of the upper portion of the basket, with the cover thereon, and with the wire-fastening means secured in place at all four ends of the wire.

Fig. 8 is a perspective of the pin or tool that is employed to stretch the wire taut over the cover.

Figure 1:
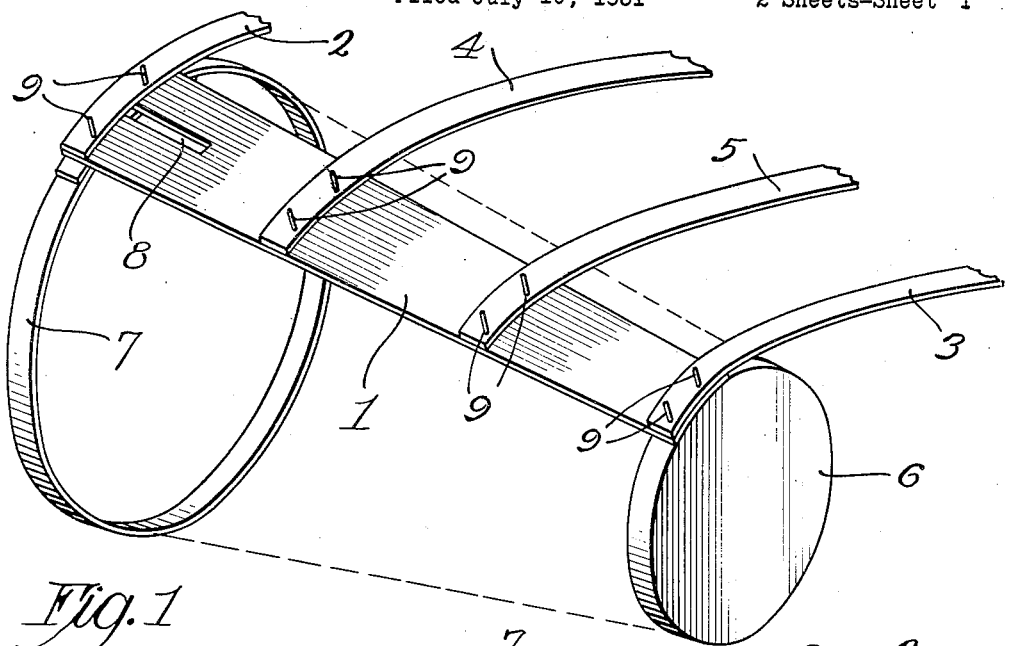
Fig. 1 is a perspective illustrating the beginning of the method or process by which the basket or receptacle is preferably made.
Figure 2:
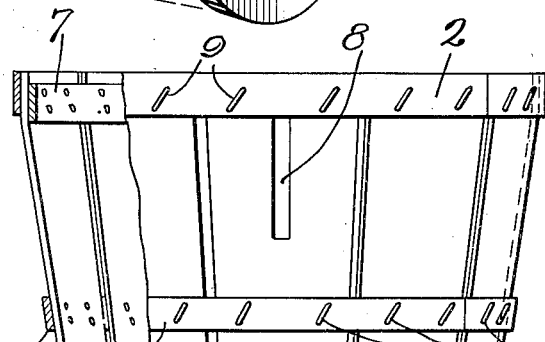
Fig. 2 is a side elevation of the finished basket or receptacle, showing one side thereof in vertical section.
Figure 3:
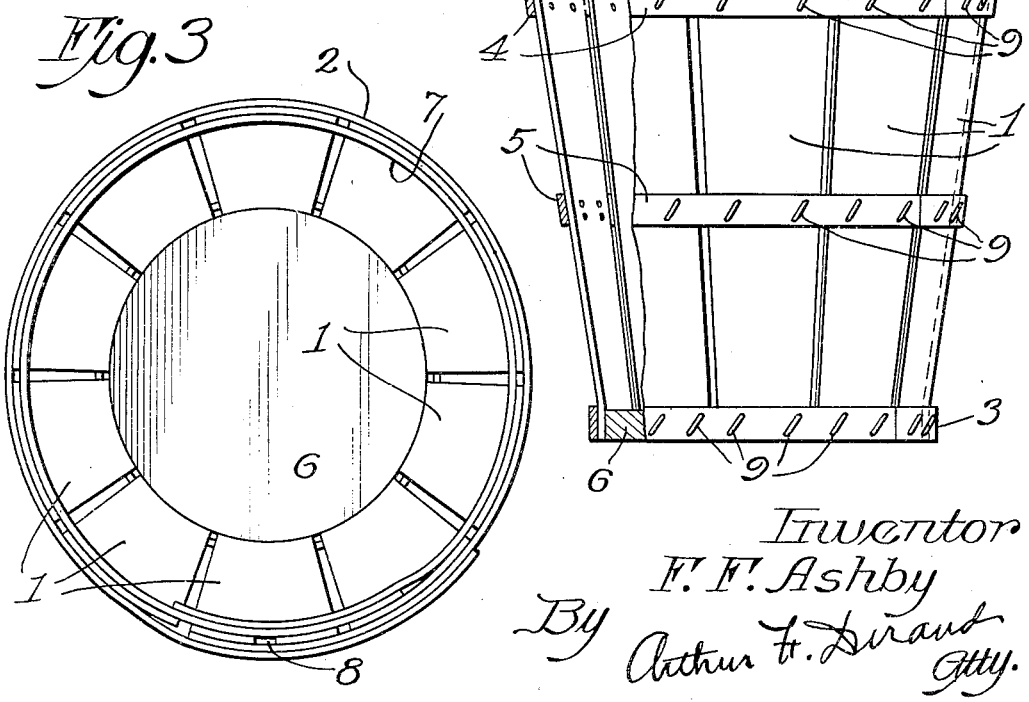
Fig. 3 is a plan view of said basket.

As thus illustrated, the basket shown and described is what is commonly called a "hamper basket", comprising staves 1, which form the side walls, top and bottom outside hoops 2 and 3, intermediate outside hoops 4 and 5, a solid bottom wall 6, and an inside top hoop 7, the latter being disposed slightly below the top or rim of the basket. One stave preferably has a slot 8 in the upper portion thereof. Preferably, in the process or method of making the basket, the stave having the slot 8 is laid in place first, on the basket form or support of the stapling machine, after the hoop 7 and the bottom 6 are also in position, and the outside hoop strips 2, 3, 4 and 5 are then first secured by staples 9 to the stave 1, the staples in the hoop 2 extending through the stave and into the hoop 7, and the staples for the hoop 3 extending through the stave and into the bottom wall 6, as shown in Fig. 1 of the drawings. The other staves are then laid in place, as by periodically rotating the basket form of the machine, until all of the staves have been secured in place, and finally the remaining ends of the hoop strips are overlapped upon their first or front ends, so that all of the hoops have a double thickness at this side of the basket.

The cover 10 may be of any suitable character, but is preferably a substantially flat cover composed of strips or sheets of veneer suitably stapled or otherwise fastened together, thus forming a strong, but more or less flexible, cover. This cover is adapted to rest upon the upper edge of the inside hoop 7, the latter providing a shoulder for this purpose.

The cover-fastening means include a wire 11, having its opposite ends secured substantially forty-five degrees apart upon the outer side of the hoop 2, by staples 12 driven through the two upper hoops and the staves. This wire is long enough, between its two eyes that are engaged by the staples, to bring its bent or middle portion at about the center of the cover, as shown in Fig. 4 of the drawings. A second wire 13 is anchored by a staple 14 diametrically opposite one of the staples 12, as shown, and this wire 13 is long enough to be looped through the bend of the wire 11 and then brought around and inserted downwardly between the inner and outer hoops of the top of the basket, through the slot 8, as shown in Fig. 5 of the drawings. The pin or tool 15 is then employed, as shown, as a sort of handle for engaging the end portion of this fourth end of the wire-fastening means, and this wire is pulled downwardly in the manner shown in Fig. 5 of the drawings, until all of the wires are stretched taut over the cover. Then the wire 13 is pulled upwardly around the lower edge of the outside hoop 2, and the loose end is twisted under and around the upper portion of the wire, as shown in Fig. 6 of the drawings. It will be seen that where the wire 13 extends under the outside hoop, the latter has a double thickness, owing to the fact that the overlap of the two end portions of this hoop is at this side of the basket, and extends across the slot 8, whereby a strong fulcrum, so to speak, is provided, against the lower edge of which the wire can be pulled tightly to stretch the wires taut, in the manner shown and described. As the outside hoop has a double thickness at this point, where the wire is looped around it, the action is more strongly resisted by the hoop, than would be the case if the wire were looped around a single thickness of the hoop. This is advantageous, for example, when the basket is over-full, so to speak, so that the contents extend a distance above the top of the basket. In such case, the more or less flexible cover is placed on top of the contents, and when the wire is stretched taut, the cover will be bent down, more or less, at the edges thereof, so that the top of the package thus formed will have an upward bulge at the top thereof. Ordinarily, if the basket is not over-full, the cover will set down in the rim of the basket, on the shoulder provided by the inside hoop, so that the upper edge of the basket rim will serve to prevent lateral displacement of the cover in the plane thereof. Preferably, the staples 12 and 14 are driven through and have their points or ends clinched upon the inner side of the inside hoop 7 of the basket, as shown in Fig. 5 of the drawings. These staples may thus be driven with their heads quite flat against the outer sides of the outside hoop, so that they will not project outwardly in an undesirable manner. As the staples cannot pull out, and as the looped portion of the wire 13, the portion that is looped under the top hoop of the basket, is also strongly anchored, the basket or other receptacle can be handled and rolled around without danger of having the cover get loose or come off. The cover, although made of thin wood, such as veneer, cannot split and break up, inasmuch as it is composed of parallel bottom strips of veneer, with top strips at right angles thereto, all stapled tightly together, so that, in combination with the fastening wires, the package has a strong and practically nonbreakable cover for the top thereof. The cover may be rotated, so to speak, from one position to another, and still serve the purpose, but preferably, when applied, the two top strips 16 thereof have their ends in engagement with the wires, as shown in Figs. 4 and 7 of the drawings.

It will be seen that the inside hoop 7 may also have its overlap joint adjacent the slot 8, if so desired. In some cases, it may be desirable to loop the free end portion of the wire 13 downwardly and under both of the upper hoops of the basket, in order to provide a strong fastening or anchoring of the wire in place, and under such circumstances the wire would be looped around or under both double thicknesses of the two hoops. The invention, therefore, is susceptible of both methods of use, as the fourth wire end portion can be looped under either the outer hoop only, as shown, or may be looped under both hoops, as occasion may require.

What I claim as my invention is:

1. A receptacle or container having a top cover therefor, and two fastening wires looped around each other at the middle of the cover and stretched taut over said cover, characterized by the fact that said wires have three ends thereof anchored to the rim of the container, and have the fourth end portion inserted downwardly inside the rim and then outwardly through the side of the container and under the lower edge of a portion of the rim, pulled taut under and against the lower edge of said rim portion and then brought upwardly and secured in place, the action of said fourth end portion of the wire against the lower edge of said rim portion serving to stretch all of the wires taut over the top of the cover.

2. A structure as specified in claim 1, said container having inner and outer hoops for the top thereof, forming said rim, the side wall of the container having a slot extending downwardly a distance below said hoops, and said fourth end portion of the wire being inserted downwardly and then outwardly through said slot, and then bent upwardly against said outer hoop, after the wire is stretched or pulled taut against the lower edge of said outer hoop.

3. A structure as specified in claim 1, said container having inner and outer hoops for the top thereof, a portion of the side walls of the container having a slot extending downwardly a distance below said hoops, and said fourth end portion of the wire being inserted downwardly in the container and then outwardly through said slot, and then bent upwardly against said outer hoop, after the wire is stretched or pulled taut against the lower edge of said outer hoop, said outer hoop having a lap-joint extending over said slot, whereby this hoop has a double thickness to stiffen it where it engages said fourth wire end portion.

4. A structure as specified in claim 1, said rim having a hoop provided with a lap-joint where it engages said fourth wire end portion, thus providing this hoop with a double thickness to stiffen it against the pull of the wire, when the said fourth wire end portion is pulled taut under this hoop to tightly stretch the wires over the cover.

5. A structure as specified in claim 1, said rim comprising inner and outer hoops, with a space between the two hoops for the downward insertion between the hoops of said fourth wire end portion, whereby this wire end portion is looped around the outer hoop.

6. A structure as specified in claim 1, said rim comprising inner and outer hoops, with a space between the two hoops for the downward insertion between the hoops of said fourth wire end portion, whereby this wire end portion is looped around and under the outer hoop, said outer hoop having a lap-joint to provide a double thickness to stiffen it where it engages the wire.

7. A structure as specified in claim 1, said rim having a shoulder extending around inside thereof, said cover being formed to set down in the container and rest upon said shoulder, whereby said rim and said wires co-operate to prevent lateral displacement of the cover in the plane thereof, with space between the outer hoop and the edge of said cover for the downward insertion of said fourth end between the hoops.

8. A structure as specified in claim 1, said cover being flexible and adapted to rest on the contents of the container, when the container is over-full, and said wires being adapted to be stretched taut enough over the cover to bend the edges of the cover downward, whereby the top of the package thus formed may have an upward bulge if the container is over-full.

9. A structure as specified in claim 1, said cover being flexible and adapted to rest on the contents of the container, when the container is over-full, and said wires being adapted to be stretched taut enough over the cover to bend the edges of the cover downward, whereby the top of the package thus formed may have an upward bulge if the container is over-full, said cover comprising lower sheet material held together by upper strips secured at right angles thereto, the four ends of said upper strips engaging the wires.

10. A structure as specified in claim 1, said cover comprising a plurality of layers of wood veneer fastened together, with the grain of some of the wood extending at right angles or crosswise to the grain of other portions of the veneer, whereby, if the container is overfull, the cover may flex in any direction under the wires without danger of splitting.

FRED F. ASHBY.